United States Patent [19]
Uz

[11] Patent Number: 5,410,354
[45] Date of Patent: Apr. 25, 1995

[54] METHOD AND APPARATUS FOR PROVIDING COMPRESSED NON-INTERLACED SCANNED VIDEO SIGNAL

[75] Inventor: Kamil M. Uz, Plainsboro, N.J.

[73] Assignee: RCA Thomson Licensing Corporation, Princeton, N.J.

[21] Appl. No.: 214,739

[22] Filed: Mar. 17, 1994

Related U.S. Application Data

[62] Division of Ser. No. 88,475, Jul. 7, 1993.

[51] Int. Cl.6 .............................................. H04N 7/12
[52] U.S. Cl. .................... 348/426; 348/467; 348/441; 348/409
[58] Field of Search ............... 348/390, 426, 441, 467, 348/409, 558, 469; H04N 7/12

[56] References Cited

U.S. PATENT DOCUMENTS

| | | | |
|---|---|---|---|
| 5,122,875 | 6/1992 | Raychaudhuri et al. | 348/390 |
| 5,146,325 | 9/1992 | Ng | 348/390 |

*Primary Examiner*—Victor R. Kostak
*Attorney, Agent, or Firm*—Joseph S. Tripoli; Eric P. Herrmann; Ronald H. Kurdyla

[57] ABSTRACT

A compression/decompression system includes a source of (1:1 60 Hz) non-interlaced scanned video signal. A preprocessor constructs (2:1 60 Hz) interlaced scanned video signal from the non-interlaced scanned video signal by selection of alternate lines of successive non-interlaced image signals. The interlaced scanned video signal is compressed according to an MPEG protocol of I, P and B frame compression algorithms. I, P and B frame compression is performed such that there are an odd number, greater than one, of B-frames between successive I/P frames (for example the sequence of compressed frames may conform to I, B1, B2, B3, P, B1, B2, B3, P, B1, B2, B3, I, B1, . . . etc). The I compressed frames, the P compressed frames and alternate B compressed frames (the frames B2 in the exemplary sequence) selectively form a primary compressed (2:1 30 Hz) interlaced video signal for reproduction by interlaced scanned receivers. The intervening B-frames selectively form a secondary compressed video. The primary and secondary compressed video signals are received by non-interlaced scanned receivers for reproducing non-interlaced scanned images, while the primary signal alone may be reproduced by interlaced scanned receivers.

5 Claims, 3 Drawing Sheets

METHOD AND APPARATUS FOR PROVIDING COMPRESSED NON-INTERLACED SCANNED VIDEO SIGNAL

This is a division of application Ser. No. 08/088,475, filed Jul. 7,1993.

This invention relates to compressed video systems and more particularly to systems for providing compressed video which may be reproduced in interlaced form at a first resolution or non-interlaced form with a second higher resolution.

BACKGROUND OF THE INVENTION

Currently the Moving Picture Experts Group (MPEG) of the International Standardization Organization is attempting to establish a compressed signal standard or protocol for the transmission of video signals. There are two basic forms of video signal, interlaced scanned signal and non-interlaced scanned signal. Compression of interlaced scanned video has advantages in that lesser bandwidth is required and both production and receiver equipment for compressing/decompressing interlaced scanned signal can be manufactured at lower cost, than for non-interlaced scan signal. The television industry tends to favor a compressed video standard which is based on interlaced scanned signal. However, them are applications which almost demand non-interlaced scanned images, particularly in that segment of the computer community which process video images. The MPEG committee is desirous of satisfying both camps, that is establishing a standard which is useful to the greatest number of potential users. The present invention is directed to a compression system which provides compressed signal for the reproduction of both interlaced and non-interlaced scanned images without significantly increasing the compressed signal data rate over compressed interlaced scanned signal.

SUMMARY OF THE INVENTION

The compression/decompression system of the present invention includes a source of (1:1 60 Hz) non-interlaced scanned video signal. A preprocessor constructs (2:1 60 Hz) interlaced scanned video signal from the non-interlaced scanned video signal by selection of alternate lines of successive non-interlaced image signals. The interlaced scanned video signal is compressed according to an MPEG protocol of I, P and B frame compression algorithms, where I-frames are intraframe compressed, P-frames are interframe predictively compressed from the last most I-frame or preceding P-frames, and B-frames are bidirectionally interframe compressed from the preceding and succeeding I- and P-frames between which they are disposed. I, P and B frame compression is performed such that there are an odd number, greater than one, of B-frames between successive I/P frames (for example the sequence of compressed frames may conform to I, B1, B2, B3, P, B1, B2, B3, P, B1, B2, B3, I, B 1,...etc). The I compressed frames, the P compressed frames and alternate B compressed frames (the frames B2 in the exemplary sequence) selectively form a primary compressed (2:1 30 Hz) interlaced video signal for reproduction by interlaced scanned receivers. The intervening B-frames selectively form a secondary compressed video. The primary and secondary compressed video signals are received by non-interlaced scanned receivers for reproducing non-interlaced scanned images, while the primary signal alone may be reproduced by interlaced scanned receivers. The intervening B-frames include the difference information between the original non-interlaced scanned video and the primary video signal. It will be appreciated by those skilled in the art of video compression that B-frame compression generates significantly less compressed data than the I or P compressed frames. Hence, according to the foregoing system, the compressed information required to augment the primary data to generate non-interlaced scanned images may be provided with only a moderate increase in compressed information.

DETAILED DESCRIPTION

Figure 1:
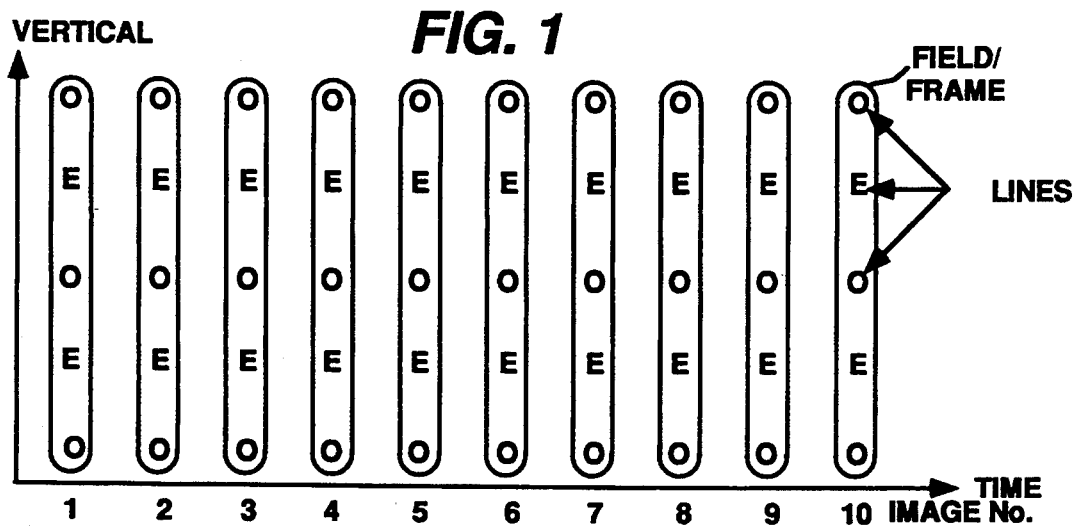
FIG. 1 is a pictorial diagram of the format of portions of respective frames of non-interlaced scanned video signal.

Referring to FIG. 1, the respective columns of letters (O's & E's) represent, in abbreviated form, the lines in non-interlaced scanned images (fields/frames) of video signal. These images occur at a rate of 60 per second. The non-interlaced scanned images occur at the field rate of interlaced scanned images and include twice the number of lines as a field of interlaced scanned video.

Interlaced scanned video occurs as successive fields of data occurring at a rate of 60 per second. Lines in even fields occur spatially between the lines of odd fields. Combining two successive fields forms a frame similar to one of the non-interlaced scanned images. However, because a finite time elapses between the scanning of successive interlaced scanned fields, a frame of interlaced scanned video will differ from a corresponding non-interlaced scanned image by virtue of any image motion occurring during the time elapsed between the scanning of successive interlaced fields.

Interlaced scanned video may be generated from the non-interlaced scanned video signal by selecting alternate lines from alternate non-interlaced scanned images. Recall that non-interlaced images occur at a rate of 60 per second and interlaced frames occur at a rate of 30 per second (nominally). Hence if the odd numbered lines of the odd numbered non-interlaced images are combined with the even numbered lines of the even numbered images, interlaced scanned frames can be produced from the non-interlaced scanned signal. These frames are represented by the respective, groupings of image lines circumscribed by the solid lines (frames I, P and B) in FIG. 2 and will be referred to as primary frames. In forming the interlaced frames from non-interlaced data only fifty percent of the image information is used. The remaining data is arranged in secondary frames (frames B I and B2) shown circumscribed by dashed lines in FIG. 2. The secondary frames are interleaved with the primary frames and respective secondary frames share data with two primary frames from two non-interlaced scanned images.

The primary frames represent interlaced scanned video data. The combination of both primary and secondary frames represent all of the, non-interlaced scanned data but not in non-interlaced format.

Figure 2:
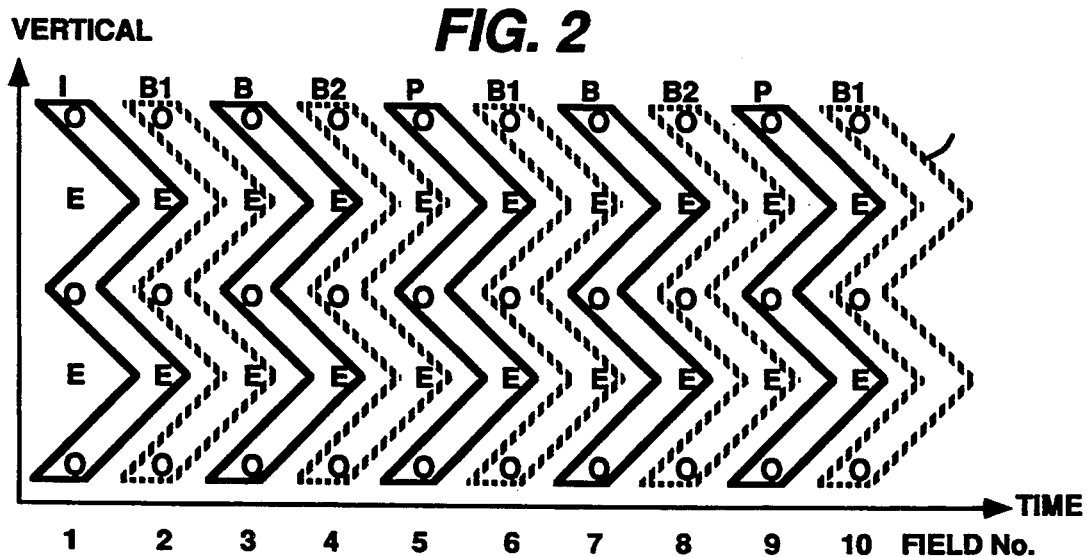
FIGS. 2 and 2A are a pictorial diagrams of alternative forms of the non-interlaced signal segmented into interlaced scanned frames of primary and secondary interlaced scanned frames of video information.
Figure 2A:
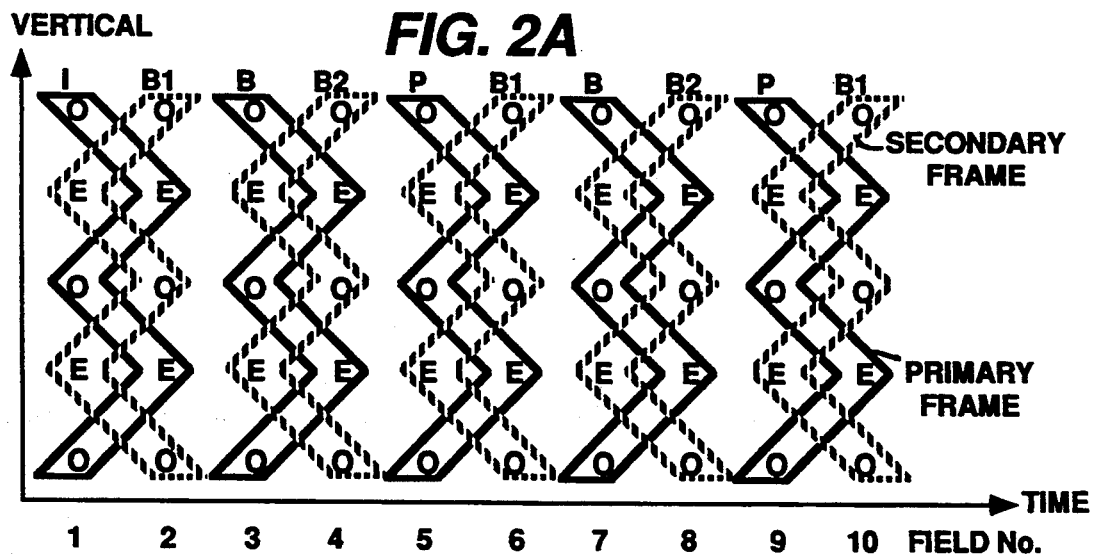

FIG. 2A illustrates a second method of forming the secondary frames from the excess non-interlaced scanned data. The secondary frames shown in FIG. 2A may be said to be intertwined with the primary frames, and respective secondary frames share data with one primary frame from two non-interlaced images. It will be noted that the odd and even fields of the intertwined secondary frames are in temporally reversed order. This is of no consequence if compression is to follow MPEG protocol, as the MPEG protocol supports a flag indicative of which of the two fields of respective frames is to be displayed first.

Figure 4:
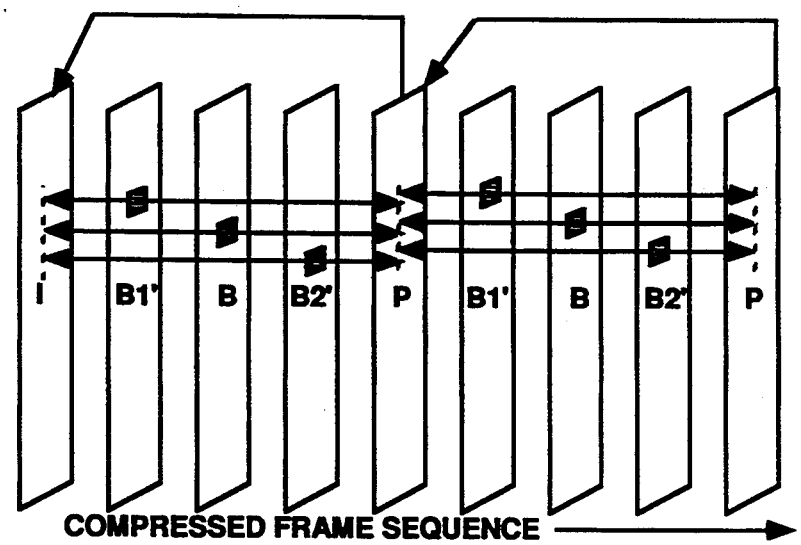
FIGS. 4 and 5 are pictorial diagrams of alternative interframe compression dependencies for B-frame compression.

A Compression sequence of I, B, B, B, P, B, B, B, P, B . . . is anticipated by the MPEG protocol, and therefore a sequence of frames of video data such as shown in FIG. 2 or 2A may be compressed in standard MPEG compression apparatus. An example of such apparatus is described in U.S. Pat. No. 5,122,875. FIG. 4 herein shows the normal frame interdependence for predictive encoding of B-frames. In FIG. 4 arrows emanating from one frame and terminating on another frame indicate prediction dependence. For example, the arrow drawn from the first P-frame and terminating on the I-frame indicates that the first P-frame is predicted from the I-frame. Similarly the arrow drawn from the second P-frame and terminating on the first P-frame indicates that the second P-frame is predicted from the first P-frame. Each of the respective B-frames disposed between a pair of anchor frames (anchor frames being I and P-frames) are predicted from one of both of the anchor frames between which they are disposed. For example, a prediction of the first B 1-frame is made from the I-frame, and another is made from the first P-frame. The more accurate prediction of the two predictions is selected if the goodness of the better prediction surpasses a minimum prediction criterion. If it does not, then a prediction is formed of the average of the two predictions. If this averaged prediction .fails a minimum prediction criterion, at least a portion of the frame is then intraframe compressed.

Figure 5:
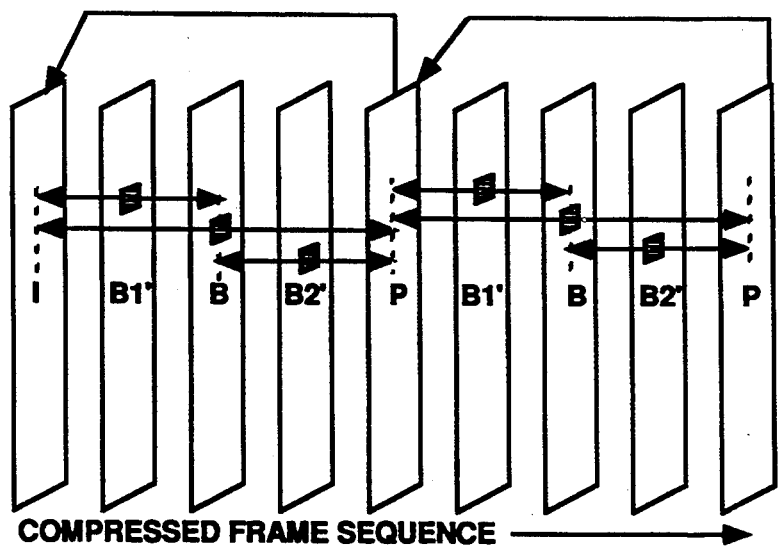

FIG. 5 illustrates an alternative compression algorithm wherein the intervening B-frames (i.e. frames B1, B2) are bidirectionally predicted from the nearest neighbor frames. Thus the first B 1-frame is predicted from the I-frame and the first B-frame. The first B2-frame is predicted from the first P-frame and the first B-frame, and so on. The FIG. 5 compression algorithm complicates the compression/decompression hardware slightly in that the working memory of the compressor and decompressor must be enlarged to store a third frame, which frame is the successively occurring B-frames.

Figure 3:
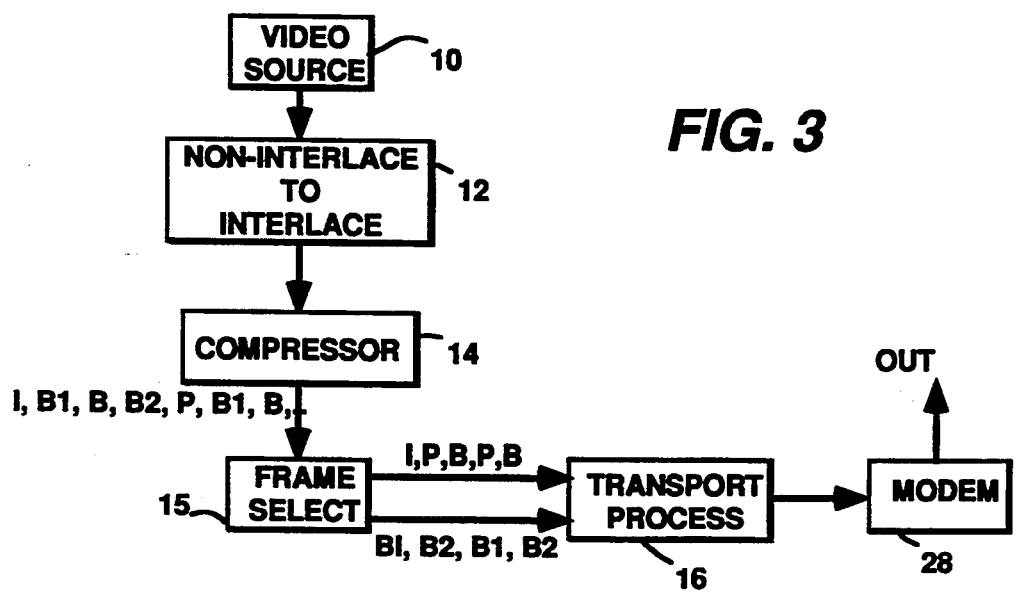
FIGS. 3 is a block diagram of compression apparatus embodying the present invention.

FIG. 3 illustrates exemplary compression apparatus. A source of video signal 10 provides non-interlaced scanned data at for example a 1:1 60 Hz rate. This video data is applied to a non-interlaced to interlaced scanned converter 12. Converter 12 separates the non-interlaced scanned image data into odd and even fields of data, for example odd numbered horizontal lines are segmented into odd fields and even numbered horizontal lines are segmented into even fields. The respective fields $F_i$ are output from the converter 12 at a 2:1, 120 Hz rate in the sequence $FO_n$, $FE_{n+1}$, $FO_{n+1}$, $FE_{n+2}$, $FO_{n+2}$ etc., where FO and FE designate odd and even fields respectively and the subscripts designate the non-interlaced scanned image from which the field was derived. Alternatively, since: MPEG compression apparatus nominally compresses video data on a frame basis, the converter 12 may provide frames of video data. Respective frames will be composed of interleaved lines of the foregoing fields ($FO_n$, $FE_{n+1}$), ($FO_{n+1}$, $FE_{n+2}$), ($FO_{n+2}$, $FE_{n+3}$), etc. assuming interleaved secondary frames. For intertwined secondary frames the frame sequence provided by the converter 12 would occur in the sequence ($FO_n$, $FE_{n+1}$), ($FO_{n+1}$, $FE_n$), ($FO_{n+2}$, $FE_{n+3}$), ($FO_{n+3}$, $FE_{n+2}$) etc.

The interlaced fields from the converter 12 are coupled to the compressor 14 which compresses the fields on a frame basis according to the MPEG protocol to produce a sequence of compressed frames. The MPEG protocol is versatile in that it permits of different intra-interframe compression sequences. That is, the compression apparatus is programmable to allow different selections of B-P sequences between I-frames. Thus one may program for two B-frames between P-frames, or three B-frames between P-frames etc. The present application suggests an odd number of B-frames between anchor frames. In particular a sequence of three B-frames between anchor frames, as shown in FIG. 2, readily allows the formation of an interlaced scanned primary compressed video signal for reproduction on an interlaced scanned receiver. In addition it readily allows formation of a secondary compressed signal, which in conjunction with the primary signal provides for reproduction of a non-interlaced scanned image.

Compressed video signal from element 14 is coupled to a selector 15 which separates the I, B and P compressed frames from the B1 and B2 frames. The I, B and P compressed frames comprise the primary interlaced scanned signal and are applied to a first buss, and the B1 and B2 frames, which comprise the secondary signal, are applied to a second buss. Both signals are applied to a transport processor 16 which segments the respective signal data into packets of predetermined amount. Synchronizing, identification and error correction data are generated for each packet and appended thereto to form transport packets for transmission. The transport packets of the respective signals may be time division multiplexed and coupled to a modem 28 which conditions the time division multiplexed signal for transmission on the desired transmission medium. Alternatively, the two respective packetized signals may be applied to separate modems for transmission on separate channels such as two cable channels.

Figure 6:
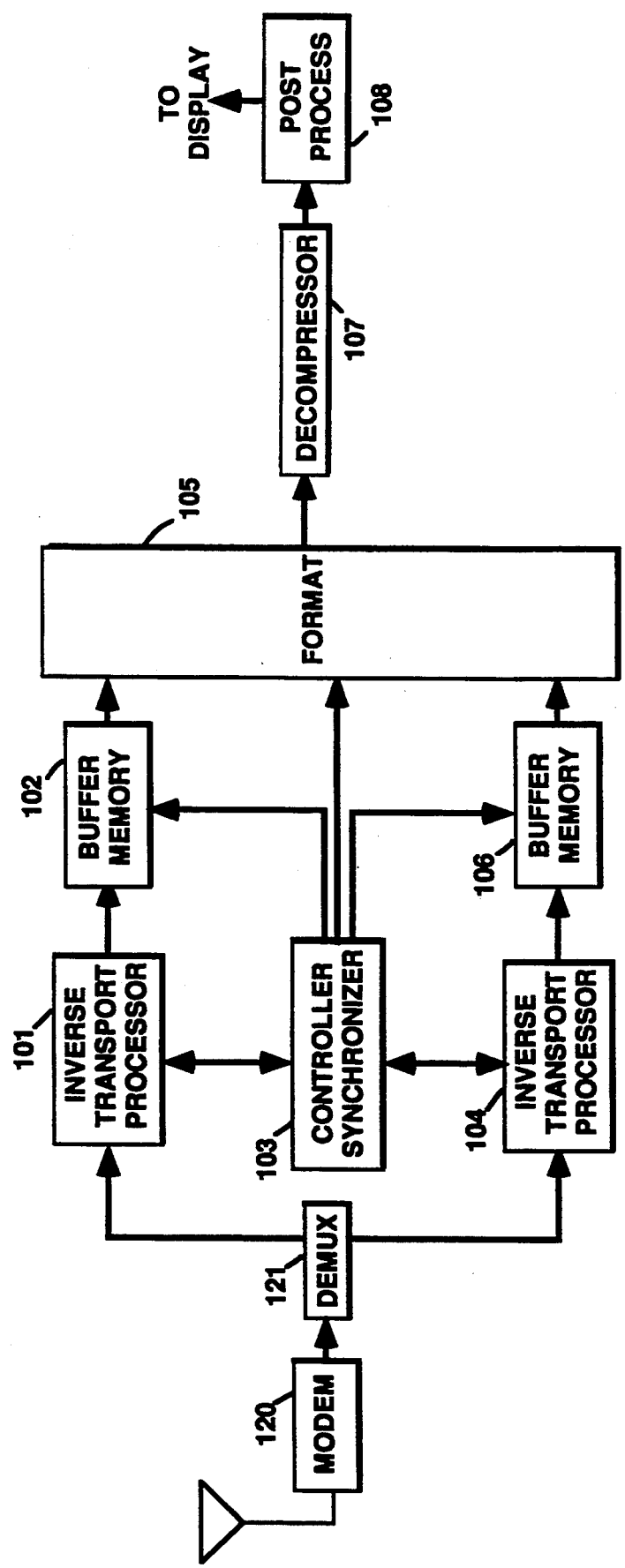
FIG. 6 is a block diagram of an exemplary non-interlaced scanned receiver for reproducing images transmitted by the FIG. 3 apparatus.

FIG. 6 illustrates an exemplary receiver for processing a time division multiplexed version of the primary and secondary compressed video signals. The FIG. 6 arrangement is configured to decompress all of the information transmitted by the modem 28, i.e. to display reproduced non-interlaced scanned images. Receivers constructed to display only the interlaced scanned data only require the elements 120, 101, 102, 107, 108 and a display device (not shown). Actually neither interlaced scanned receivers nor non-interlaced scanned receivers require a separate demultiplexer 121 and it is only shown to illustrate the requisite inverse functions of the FIG. 3 arrangement. The respective transport packets include identification codes indicating whether the data is primary or secondary. The interlaced scanned receivers will be programmed to process only transport packets in which data is identified as primary. Similarly in a non-interlaced scanned receiver, a single inverse transport processor can be arranged to perform the demultiplexing function based on the primary/secondary identification codes within the transport packets. This type of demultiplexing is, in general, described in the U.S. Pat. No. 5,122,,875.

In FIG. 6, time division multiplexed transmitted data is received by a modem 120 which provides baseband compressed time division multiplexed data. This data is coupled to a demultiplexer 121 which separates the primary field data transport packets from the secondary field data transport packets. The primary and secondary field data are respectively coupled to the inverse transport processors 102 and 106, wherein the compressed video signal payloads are separated from the ancillary (e.g. synchronization, identification etc.) data transmitted therewith. The primary field video data is applied to a buffer memory 102 and secondary field video data is coupled to a buffer memory 106. Transport packet identifier and synchronization data from respective packets are coupled to a controller 1033. The controller 1033, responsive to the ancillary transport packet data, provides the compressed video signals from both of the buffer memories to a formatter 105. Formatter 105 is a two to one multiplexer which is responsive to the controller 1033 to reform the compressed frames contained in the buffer memories 102 and 106 into the sequence of compressed interlaced frames provided by the compressor 14 of FIG. 3. Since the secondary signal contains only B-frames (interframe predicted frames) it cannot be decompressed independently of the primary signal before recombination therewith. Rather the original compressed frame sequence must be re-established before decompression.

Resequenced compressed frames (I, B1, B, B2, P, B1, B, B2, P, B1, ... ) from the formatter 105 are coupled to a decompressor 107 which performs the inverse process of the compressor 14 and outputs decompressed (2:1 60 Hz) interlaced scanned frames of video. Recall however that each frame of the original interlaced scanned data was derived from two successive images of non-interlaced video. To re-establish the non-interlaced images, the interlaced scanned video from the decompressor 107 is applied to a post processor 108 which reformats the successive interlaced fields into non-interlaced images. Post processor 108, responsive to the interlaced fields which are provided in an odd-even field sequence, resequences these fields to provide non-interlaced image frames of the following combination of fields ($FO_n$, $FE_{n-1}$), ($FO_{n+1}$, $FE_n$), ($FO_{n+2}$, $FE_{n+1}$) ... etc. This is performed simply by writing the decompressed fields to memory as they occur from the decompressor and then reading the combination of fields from such memory as non-interlaced images in the field combinations indicated above.

Whether the compression is performed according to the algorithm pictured in FIG. 4 or FIG. 5, the decompressor 107 in the receiver will of necessity perform the inverse function. This has no effect on either the preprocessor, the transport processors, or the post processor of the alternative systems.

What is claimed is:

1. Apparatus for decompressing compressed video signal of the type including a primary compressed component signal corresponding to 2:1 NHz compressed interlaced scanned video signal (NHz being a predetermined frame rate), and a secondary compressed component signal representing interlaced scanned frames interleaved or intertwined with frames of said primary component, said primary and secondary compressed components occurring in respective transport packets including signal identifiers, said apparatus comprising:

means for detecting said primary and secondary compressed signals;

means responsive to said signal identifiers in transport packets of detected said primary and secondary compressed signals, for composing a compressed signal of frames of said secondary compressed component signal alternating with frames of said primary compressed component signal;

a decompressor, responsive to composed signal of alternating frames of said primary and secondary compressed components for providing a 2:1 2 NHz interlaced scanned decompressed video signal.

2. The apparatus set forth in claim 1 further including:

a post-processor, responsive to said 2:1 2 NHz interlaced scanned decompressed video signal, for converting such signal to a 1:1 2 NHz non-interlaced scanned signal.

3. Apparatus for decompressing compressed video signal of the type including a primary compressed component signal corresponding to 2:1 NHz compressed interlaced scanned video signal (NHz being a predetermined frame rate), and a secondary compressed component signal representing interlaced scanned frames interleaved or intertwined with frames of said primary component, said primary and secondary compressed components occurring in respective transport packets including signal identifiers, said apparatus comprising:

a source of said primary and secondary compressed components means responsive to said signal identifiers in transport packets of said primary and secondary compressed components, for composing a signal of compressed frames of said secondary compressed component signal alternating with frames of said primary compressed component signal;

means including decompression means, responsive to alternating compressed frames of said primary and secondary compressed components for providing a 1:1 2 NHz non-interlaced scanned signal.

4. The apparatus set forth in claim 3 wherein said means including compression means comprises:

a decompressor, responsive to alternating frames of said primary and secondary compressed components for providing a 2:1 2 NHz interlaced scanned decompressed video signal; and a post-processor, responsive to said 2:1 2 NHz interlaced scanned decompressed video signal, for converting such signal to a 1:1 2 NHz non-interlaced scanned signal.

5. Apparatus for decompressing compressed video signal of the type including a primary compressed component signal including frames compressed according to I, P and B compression format, and a secondary compressed component signal including frames compressed according to only B compression format (I, P, B compression formats being defined in the MPEG protocol), said primary and secondary compressed components occurring in respective transport packets including signal identifiers, said apparatus comprising:

means for detecting said primary and secondary compressed signals;

means responsive to respective transport packets of detected said primary and secondary compressed signals, for composing a compressed signal of frames of said secondary compressed component signal alternating with frames of said primary compressed component signal;

a decompressor, responsive to composed signal of alternating frames of said primary and secondary compressed components for providing a decompressed video signal.

* * * * *